United States Patent [19]

Haendle

[11] Patent Number: 4,586,085
[45] Date of Patent: Apr. 29, 1986

[54] DEVICE FOR TAKING PICTURES FROM A MONITOR

[75] Inventor: Joerg Haendle, Erlangen, Fed. Rep. of Germany

[73] Assignee: Siemens Aktiengesellschaft, Berlin and Munich, Fed. Rep. of Germany

[21] Appl. No.: 530,557

[22] Filed: Sep. 9, 1983

[30] Foreign Application Priority Data

Sep. 14, 1982 [DE] Fed. Rep. of Germany ....... 3234118

[51] Int. Cl.⁴ ............................................. H04N 5/84
[52] U.S. Cl. .................................... 358/244; 358/214; 346/110 R
[58] Field of Search ...................... 358/244, 244.2, 215, 358/214, 345, 348, 335; 346/110 R; 355/20; 350/452; 360/33.1

[56] References Cited

U.S. PATENT DOCUMENTS

| | | | |
|---|---|---|---|
| 3,450,833 | 6/1969 | Hobrough | 358/214 |
| 3,809,888 | 5/1974 | Stock | 346/110 R |
| 3,824,336 | 7/1974 | Gould | 358/214 |
| 3,919,474 | 11/1975 | Benson | 358/345 |
| 4,051,535 | 9/1977 | Inglis | 350/452 |
| 4,319,281 | 3/1982 | Gall et al. | 358/244 |

*Primary Examiner*—Alan Faber
*Attorney, Agent, or Firm*—Mark H. Jay

[57] ABSTRACT

A device for taking pictures with a monitor, a lens, a mirror that can be moved within the path of the rays of the monitor and a film camera located in one of the ray paths that can be selected by the mirror. A transparent holder for a sheet film is attached to the housing and located in the other path. A photo-electric converter, positioned on this holder, follows the path of the rays. By means of the control switch, the monitor can be controlled so that a light dot is generated on the screen of the monitor and reproduced on the sheet film.

1 Claim, 1 Drawing Figure

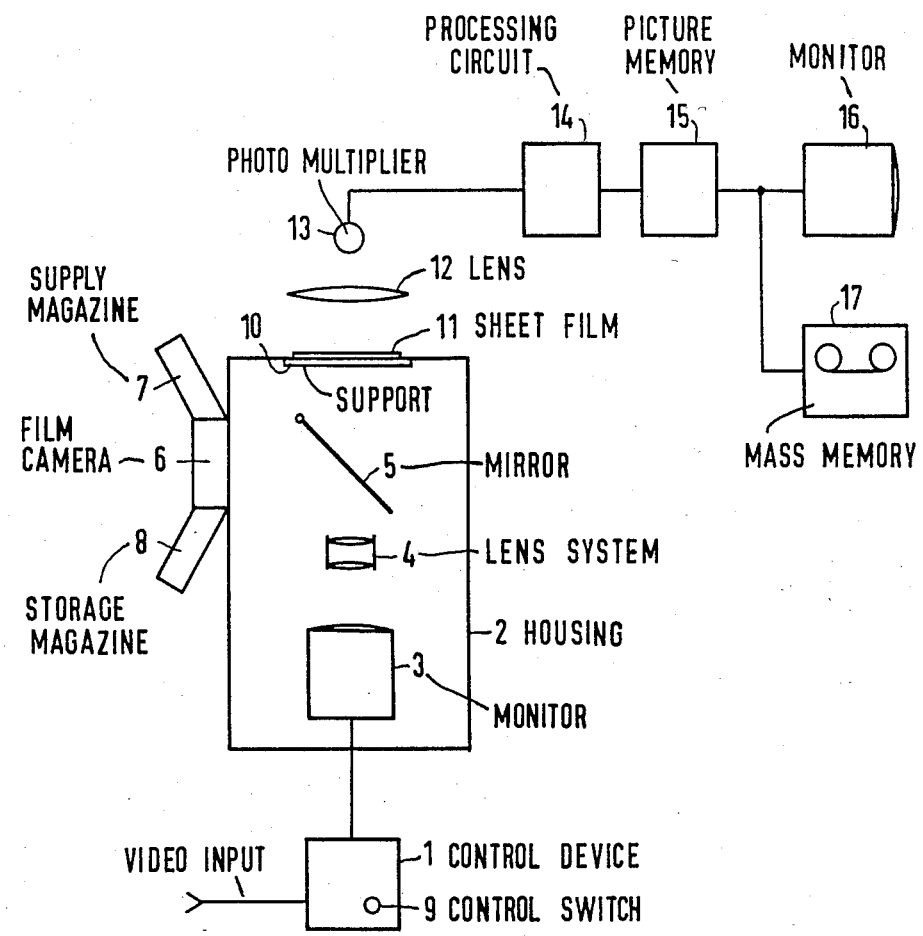

DEVICE FOR TAKING PICTURES FROM A MONITOR

BACKGROUND OF THE INVENTION

The invention relates to a device for taking pictures with a monitor, a lens, an adjustable mirror located within the path of the monitor rays, and a film camera located in one of the ray paths that can be selected by the mirror. Such devices are used for the permanent storage of television images and x-rays.

Such a picture-taking device is described in German Patent Publication No. 2,936,228 (U.S. Pat. No. 4,319,281 is equivalent) for which a television monitor is housed in a casing. An adjustable mirror makes it possible to select the path of the rays. Thus, a film camera can be hit by the light from the monitor when the mirror is retracted. If, however, the mirror is moved into the path of the monitor rays, the television picture is transferred to large sheet films by means of an interchangeable lens. Therefore, this device can only expose either a sheet film or a roll film.

SUMMARY OF THE INVENTION

The object of the invention is to improve the above described device so that it incorporates the option of scanning a photographic film for televised reproduction in addition to taking a picture of a television image with little additional effort.

The object of the invention is achieved by placing a transparent holder for a sheet film in the other ray paths by positioning a photoelectric converter on this holder which follows the path of the rays. In addition, the monitor is controlled by a control switch so that a light dot is generated on the screen of the monitor and is reproduced on the sheet film, and which scans the film by means of the flying-spot method.

This device makes it possible to take pictures of a television image or to scan a photographic picture for televised reproduction with one unit.

The photographic converter can be kept small if an optical lens is mounted between the holder and the converter. In addition, it is advantageous to utilize a photomultiplier as a photoelectric converter.

Other features and advantages of the present invention will become apparent from the following detailed description, and from the claims.

For a full understanding of the present invention, reference should now be made to the following detailed description and to the accompanying drawing.

BRIEF DESCRIPTION OF THE DRAWING

The single FIGURE is a diagrammatic representation of an embodiment of the invention.

DETAILED DESCRIPTION

Referring to the drawing, a video signal is sent from a television camera (not shown) or from a picture memory (not shown) to control device 1 which is connected to monitor 3 in housing 2. A lens 4 is mounted in front of monitor 3. An adjustable mirror 5, which in its retracted state reproduces the television image of monitor 3 on the film of film camera 6, is provided in the path of the rays. Film camera 6 inclues film supply magazine 7 and storage magazine 8. The film (not shown) is advanced from film supply magazine 7 over transport rollers (not shown) to the picture taking position and then it is stored in storage magazine 8 after being exposed.

To scan sheet film 11, which is positioned on transparent holder 10, mirror 5 is retracted from the path of the rays. Simultaneously, control device 1, for monitor 3, is switched over by means of control switch 9 so that a light dot which moves over the screen of the monitor is generated by the control device. This light dot is reproduced on sheet film 11 via lens 4 so that the film can be scanned dot-by-dot. Utilizing lens 12, which can be for example, a Fresnel lens, the light dot the intensity of which is reduced by sheet film 11 is reproduced on photomultiplier 13. The output signal of photomultiplier 13 is forwarded to processing circuit 14 which converts it into video signals that are read into picture memory 15. After the photograph has been scanned as described above, it can be reproduced on external monitor 16 and read into mass memory 17.

Sheet film 11 is scanned according to the so-called flying spot method. This method utilizes a light dot which moves over the subject to be photographed. This scanning, for example, can be done slowly so that the afterglow of the screen of monitor 3 does not have a limiting effect on the resolution. The light dot moving across the screen of monitor 3 exhibits a constant brightness. After the light dot moves through sheet film 11, the intensity of the light is modulated and supplies an appropriate signal at the output of photomultiplier 13. This signal is then read into picture memory 15 as a video signal. The image can be continously read out from picture memory 15 and reproduced on monitor 16 so that it can be checked prior to possible storage in mass memory 17.

This device provides one unit which can both produce hard copies of television images, and can scan sheet films for storage in television mass memories with little additional effort.

There has thus been shown and described a novel apparatus for taking pictures from a monitor which fulfills all the object and advantages sought. Many changes, modifications, variations and other uses and application of the subject invention will, however, become apparent to those skilled in the art after considering this specification which discloses embodiments thereof. All such changes, modifications, variations and other uses and applications which do not depart from the spirit and scope of the invention are deemed to be covered by the invention which is limited only by the claims which follow.

I claim:

1. In a device for taking pictures from a monitor having a monitor, a lens, a mirror that can be moved within the path of rays of the monitor to select between two different ray paths, and a film camera in one of said ray paths for taking a picture of said monitor, the improvement comprising a transparent holder for a sheet film provided in the other one of said ray paths, a photoelectric detector positioned in light receiving relationship to said holder and capable of generating an output signal corresponding to the received light intensity, a lens provided between said holder and said detector for focusing light received from the entire sheet film surface upon said detector, and a control device for controlling said monitor and said mirror so that said mirror is moved to select one of said ray paths and, when the ray path to said sheet film is selected, a light dot is generated on the screen of the monitor for projection onto said sheet film, said light dot scanning the entire sheet film surface.

* * * * *